United States Patent [19]

Tsunoda et al.

[11] 4,280,788
[45] Jul. 28, 1981

[54] MULTISTAGE HYDRAULIC MACHINE SYSTEM AND A METHOD FOR CONTROLLING THE OPERATION THEREOF

[75] Inventors: Sachio Tsunoda; Ichiro Yamagata, both of Yokohama, Japan

[73] Assignee: Tokyo Shibaura Denki Kabushiki Kaisha, Kawasaki, Japan

[21] Appl. No.: 35,699

[22] Filed: May 3, 1979

[30] Foreign Application Priority Data

May 22, 1978 [JP] Japan ............................... 53-60850

[51] Int. Cl.³ ..................... F01D 19/00; F01D 27/12
[52] U.S. Cl. ..................................... 415/1; 415/163
[58] Field of Search ..................................... 415/1–3, 415/62–64, 161–163, 146

[56] References Cited

U.S. PATENT DOCUMENTS

| 3,756,739 | 9/1973 | Boussuges | 415/161 |
| 3,799,694 | 3/1974 | Duzan | 415/161 |
| 3,957,392 | 5/1976 | Blackburn | 415/146 |
| 3,990,810 | 11/1976 | Amos et al. | 415/161 |

*Primary Examiner*—Leonard D. Christian
*Attorney, Agent, or Firm*—Oblon, Fisher, Spivak, McClelland & Maier

[57] ABSTRACT

Disclosed is a multistage hydraulic machine system which comprises a multistage hydraulic pump/pump-turbine including a highest-pressure stage having movable guide vanes with variable opening of water path arranged round a runner and a lower-pressure stage or stages having fixed guide vanes with fixed opening of water path arranged round a runner or runners, and a control unit for controlling the operation of the multistage hydraulic pump/pump-turbine, whereby the opening of the movable guide vanes is controlled by the control unit so that such opening is larger than that of the fixed guide vanes for a large-flow normal operation of the pump/pump-turbine and smaller for a small-flow normal operation.

3 Claims, 6 Drawing Figures

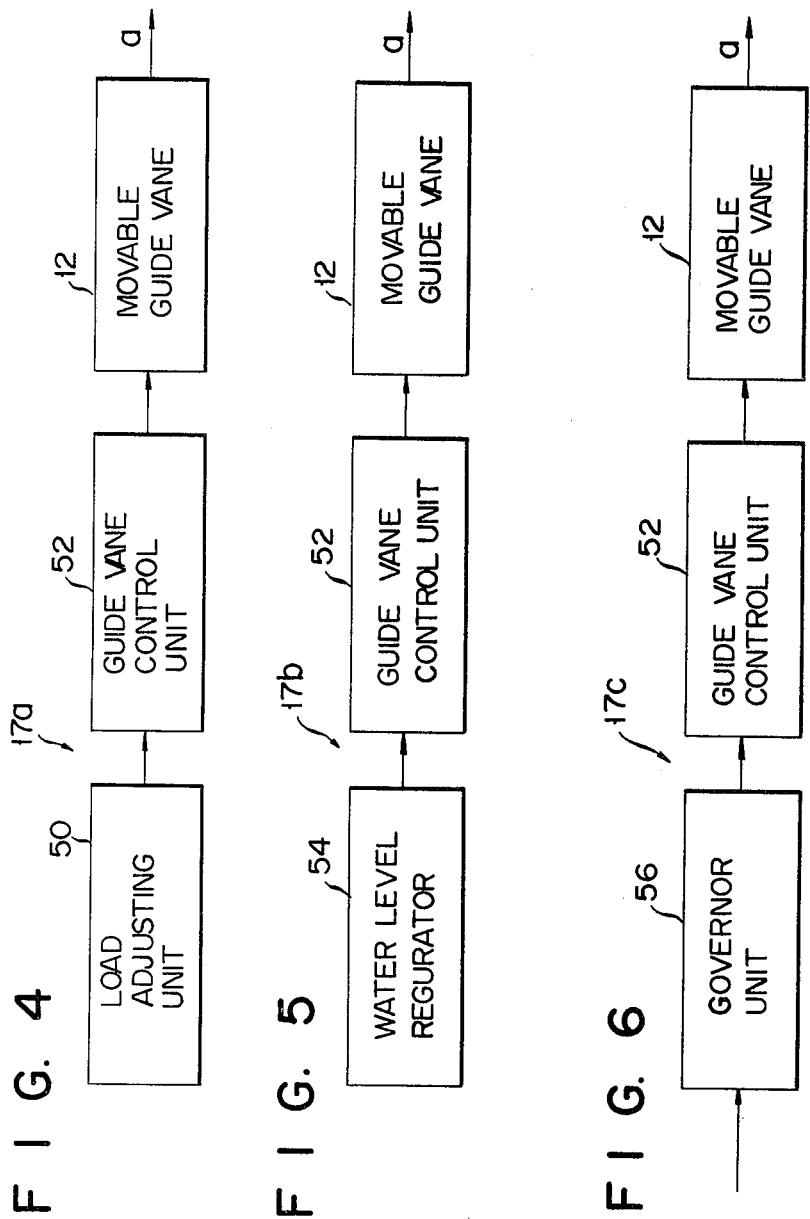

MULTISTAGE HYDRAULIC MACHINE SYSTEM AND A METHOD FOR CONTROLLING THE OPERATION THEREOF

BACKGROUND OF THE INVENTION

1. Field of the Invention

This invention relates to a multistage hydraulic machine system including a multistage hydraulic machine having a runner at each of highest- to lowest-pressure stages which communicate by means of a return passage and a mechanism for controlling the operation of the multistage hydraulic machine, and a method for operating the same. (here the multistage hydraulic machine means a multistage-type pump, or pump-turbine.)

2. Description of the Prior Art

In general, operation control for a hydraulic machine may be achieved by adjusting the quantity of water flowing through the hydraulic machine by means of guide vanes arranged around a runner or an inlet valve at an inlet portion of the machine.

Also for the type of multistage hydraulic machine having a runner for each of highest- to lowest-pressure stages which communicate by means of a return passage, there have been designed and proposed various systems for controlling the operation of the machine by controlling water flow at each stage by means of guide vanes arranged around the runner for each stage.

However, in the aforesaid multistage hydraulic machine with such complicated construction wherein the highest- to lowest-pressure stages are successively connected in series by means of the return passage, it is very difficult, from a structural point of view, to perform opening and closing operations by means of an operation mechanism coupled to guide vanes that are arranged round the runner for each stage.

Accordingly, a conventional multistage hydraulic machine is usually so constructed that only fixed guide vanes with fixed opening of water path are arranged around the runner for each stage and that the operation mode may be controlled by opening and closing the inlet valve at the inlet portion of the machine to adjust the quantity of water flow. In such machine, however, it is impossible to properly adjust the flow condition at the outer peripheral portion of the runner in accordance with the flow rate, so that the hydraulic performance of every stage is deteriorated when the flow rate becomes substantially lower or higher than the designed rate, thereby reducing the integrated hydraulic capability of the hydraulic machine in operation. Moreover, if the flow rate is adjusted with the inlet valve moderately closed, the loss of head at the inlet valve portion will increase to nullify water current energy corresponding to such loss, thereby deteriorating the working efficiency of a power plant.

SUMMARY OF THE INVENTION

The object of this invention is to provide a multistage hydraulic machine system free from the aforesaid defects to which the prior art multistage hydraulic machine and the method of controlling the operation thereof are subject, and capable of performing a normal operation with satisfactory hydraulic characteristics and also of safely continuing the operation even in a transient operating condition that is experienced while the operation mode is being changed.

In order to attain the above object, the machine system of this invention, which includes movable guide vanes with variable opening of water path arranged in a circular row around a highest-pressure stage and fixed guide vanes with fixed openings of water path arranged in a circular row around a lower-pressure stage or stages, is so designed that the opening of the movable guide vanes is controlled by an operation control means to be larger than that of the fixed guide vanes in a large-flow normal operation, and that the former is controlled to be smaller than the latter in a small-flow normal operation. The method for the operation control of the invention is a method to control the movable vanes in the aforesaid manner.

According to the above-mentioned machine system and method, the hydraulic performance may be improved by controlling the opening of water path defined by the movable guide vanes to be smaller than the fixed opening of water path defined by the fixed guide vanes in a lower operation range of flow as compared with the normal operation condition, while an operation with larger turbine output than that for the normal operation may be achieved by enlarging the opening of the movable guide vanes.

Moreover, according to this invention, the integrated hydraulic performance in a small-flow operation range for the higher-head side or a large-flow operation range for the lower-head side, in a pump operation of the multistage hydraulic machine, may be improved by reducing or enlarging the variable opening of water path defined by the movable guide vanes relatively to the fixed opening of water path defined by the fixed guide vanes.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIGS. 4 to 6 are block diagrams of control systems for controlling the operation of the multistage hydraulic machine.

DETAILED DESCRIPTION OF THE PREFERRED EMBODIMENT

Figure 1:
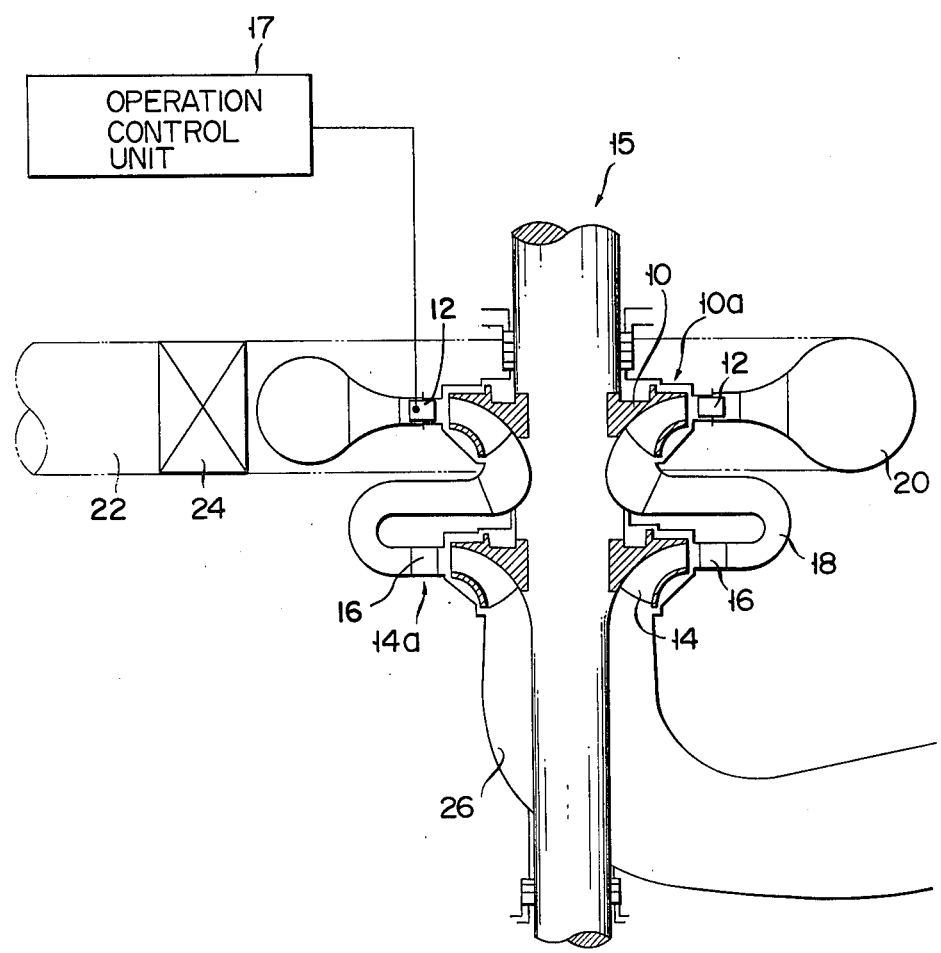
FIG. 1 is a structural drawing showing an embodiment of the multistage hydraulic machine system according to this invention.

FIG. 1 shows, to facilitate the understanding of this invention, the construction of a simple embodiment of the multistage hydraulic machine system according to the invention, including a Francis-type two-stage hydraulic machine 15 and an operation control unit 17 for the machine 15. In FIG. 1, there are shown a runner 10 for a higher-pressure stage 10a, movable guide vanes 12 for the higher-pressure stage 10a arranged in a circular row round the runner 10 and having variable opening of water path, a runner 14 for a lower-pressure stage 14a, and fixed guide vanes 16 for the lower-pressure stage 14a arranged in a circular row round the runner 14 and having fixed opening of water path, the higher-pressure stage 10a being connected in series with the lower-pressure stage 14a by means of a return passage 18. The movable guide vanes 12 are coupled with an operation mechanism (not shown), which is controlled by a control unit (not shown) so that the opening of the movable guide vanes 12 may become smaller or larger than that of the fixed guide vanes 16 in accordance with water flow rate in a normal or transient operation. Numeral 20 designates a casing located correspondingly to the higher-pressure stage runner 10, which communicates with a pipeline 22 through an inlet valve 24. Numeral 26 denotes a draft tube forming a waterway for the lower-pressure stage runner 14.

Accordingly, in the aforementioned arrangement of the two-stage hydraulic machine, water flows from the pipeline 22 into the casing 20 connected thereto in a turbine operation with the inlet valve 24 open. The water passes successively through the movable guide vanes 12 and runner 10 for the higher-pressure stage 10a, the return passage 18, and the fixed guide vanes 16 and runner 14 for the lower-pressure stage 14a, and flows into the draft tube 26 connected to a tail race (not shown).

In a pump operation, on the other hand, a water current pumped up by the runner 14 for the lower pressure stage 14a flows from the draft tube 26 to the pipeline 22 by a route opposite to that for the turbine operation.

Thus, in the above-mentioned embodiment, the fixed guide vanes 16 with fixed opening of water path are arranged round the runner 14 for the lower-pressure stage 14a (all stages except the highest-pressure stage for a multistage hydraulic machine with three or more stages) which can hardly be provided with movable guide vanes because of structural difficulties, while the movable guide vanes 12 are arranged only around the runner 10 for the higher-pressure stage 10a (highest-pressure stage for a multiple hydraulic machine with three or more stages) which allows relatively easy installation of movable guide vanes from a structural point of view.

Figure 2:
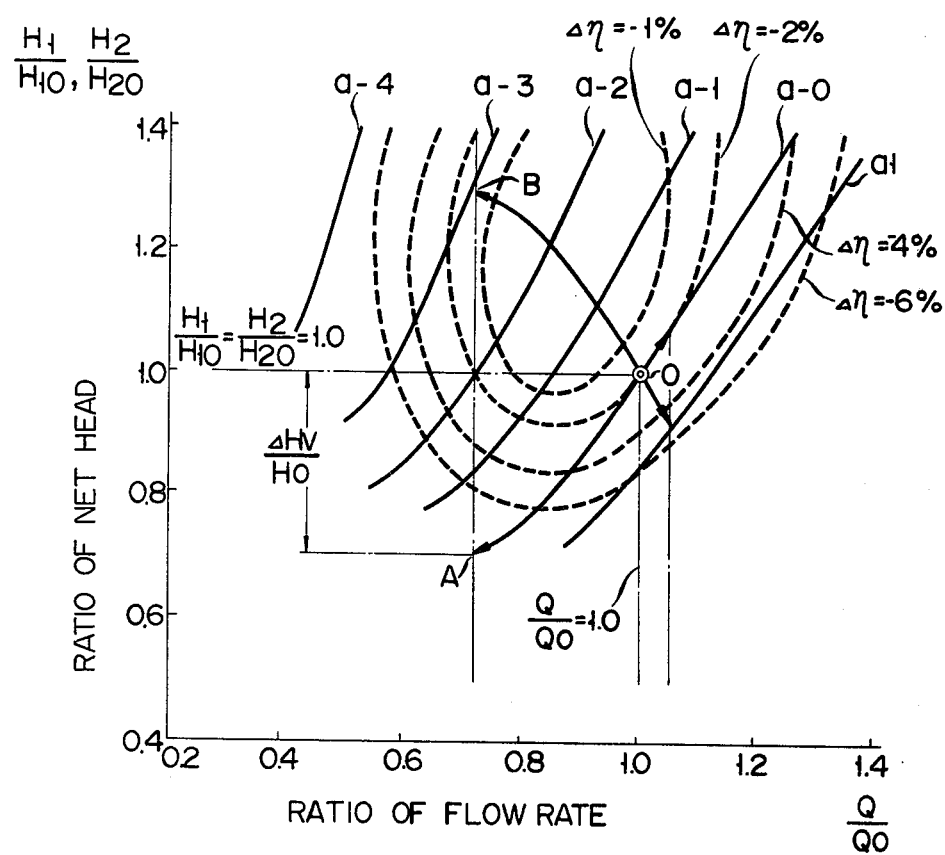
FIG. 2 is a graph showing turbine characteristics of the individual stages of a multistage hydraulic machine included in the machine system of FIG. 1.

Referring now to the drawing of FIG. 2, there will be described the hydraulic characteristics of the two-stage hydraulic machine with the above-mentioned construction in a normal turbine operation. FIG. 2 shows hydraulic characteristic curves for the respective stages of the two-stage hydraulic machine in the turbine operation. In FIG. 2, H1 is a turbine net head for the higher-pressure stage 10a, H2 is a turbine net head for the lower-pressure stage 14a, Q is a flow rate. H10, H20 and Q0 are values corresponding to H1, H2, and Q that are obtained under normal turbine operation condition (point O as illustrated), where H1 is equal to H2. a0 is an opening of water path at each stage for the normal turbine operation, and a1 is an opening of water path at the higher-pressure stage 10a larger than the normal opening a0. a-1, a-2, ... are openings at the higher-pressure stage 10a smaller than the normal opening a0, and $\Delta \eta$ is a relative turbine efficiency difference represented by a relative difference from the maximum turbine efficiency. FIG. 2 illustrates the relationship between the flow rate and the turbine net head for each stage, with ratios of flow rate Q/Q0 as the axis of abscissa and ratios of turbine net head H1/H10 and H2/H20 at the higher- and lower-pressure stages 10a and 14a as the axis of ordinate. Curves a0, a1, ... are characteristic curves corresponding to the openings a0, a1, ... respectively.

Accordingly, a combined turbine net head H0 of the hydraulic machine may be obtained by adding up the turbine net heads for the two stages.

Where the inlet valve 24 is fully open and each stage is in the normal turbine operation condition (point O in FIG. 2), the turbine net head for each stage is the half of the combined turbine net head H0 that affects the hydraulic machine. So we obtain net

H1+H2=H0

H1=H2

H1=H10=H0/2 and

H2=H20=H0/2  (1)

When reducing the flow rate from the level for the normal turbine operation by gradually closing the inlet valve 24 with the opening of water path for each stage maintained at the normal opening level, the operation condition for either stage traces a locus 0→A on the characteristic curve corresponding to the normal opening a0, shifting to the lower head side by a head loss $\Delta Hv/2$ of the inlet valve 24, as shown in FIG. 2. In consequence, the machine is operated with reduced hydraulic capability according to the following relationship.

H1+H2=H0−$\Delta$Hv

H1=H2

H1=(H0−$\Delta$Hv)/2=H10−$\Delta$Hv/2 and

H2=(H0−$\Delta$Hv)/2=H20−$\Delta$Hv/2  (2)

The above situation will be caused by the prior art multistage hydraulic machine with fixed vanes arranged around a runner for each stage in which the condition for turbine operation is controlled by adjusting the flow by means of the inlet valve 24. It may be seen from the locus 0→A on the characteristic curve that the hydraulic energy for the head loss is nullified and that both stages are operated with low hydraulic capability, resulting in a quite wasteful manner of operation of the machine.

In the two-stage hydraulic machine of this embodiment, however, the flow rate is reduced from the level for the normal turbine operation (point O) by adjusting only the opening of water path of the movable guide vanes 12 for the higher-pressure stage 10a with the inlet valve 24 kept fully open.

Referring FIG. 2, when the opening of water path at the higher-pressure stage 10a is reduced gradually, the operation condition for the lower-pressure stage 14a with the fixed opening follows the locus 0→A on the characteristic curve corresponding to the normal opening to deteriorate relatively the hydraulic performance. Since the turbine net head H1 increases as the opening of water path is reduced, on the other hand, the operation condition for the higher-pressure stage 10a traces a locus 0→B along which the hydraulic capability is augmented in accordance with the following relationship.

H1+H2=H0 and

H1>H2  (3)

Accordingly, in the two-stage hydraulic machine of this embodiment, the operation range for the higher-pressure stage 10a may be shifted for higher hydraulic performance to improve the integrated hydraulic capability of the hydraulic machine. Moreover, there will be no increase in the loss of head at the inlet valve 24, so that the hydraulic machine will be able to be operated highly efficiently and economically as compared with the case of the multistage hydraulic machine operated by the inlet valve control. Where the combined turbine net head H0 affecting the hydraulic machine is given, it is impossible to operate the prior art multistage hydraulic machine based on the inlet valve control at a flow rate higher than the level for the normal turbine operation (point O) with the inlet vane 24 fully open as shown in FIG. 2, because of the fixed opening of water path for each stage. The two-step hydraulic machine according to this embodiment can, however, adjust the opening of water path of the movable guide vanes for the higher-pressure stage so as to be larger than the normal opening a0 or the fixed opening at the lower-pressure stage. Therefore, a large turbine output can be produced at a flow rate higher than the level for the normal operation (point O) in accordance with the following relationship.

$$H1 + H2 = H0 \text{ and}$$

$$H1 < H2 \qquad (4)$$

Thus, according to this invention, the multistage hydraulic machine can effectively be operated and, in normal turbine operation, the hydraulic efficiency may be improved in the smaller-flow rate range by controlling the opening of water path defined by the movable guide vanes 12 so as to be smaller than the fixed opening of water path defined by the fixed guide vanes 16, while an operation with relatively large turbine output may be achieved by making the variable opening larger than the fixed opening.

Figure 3:
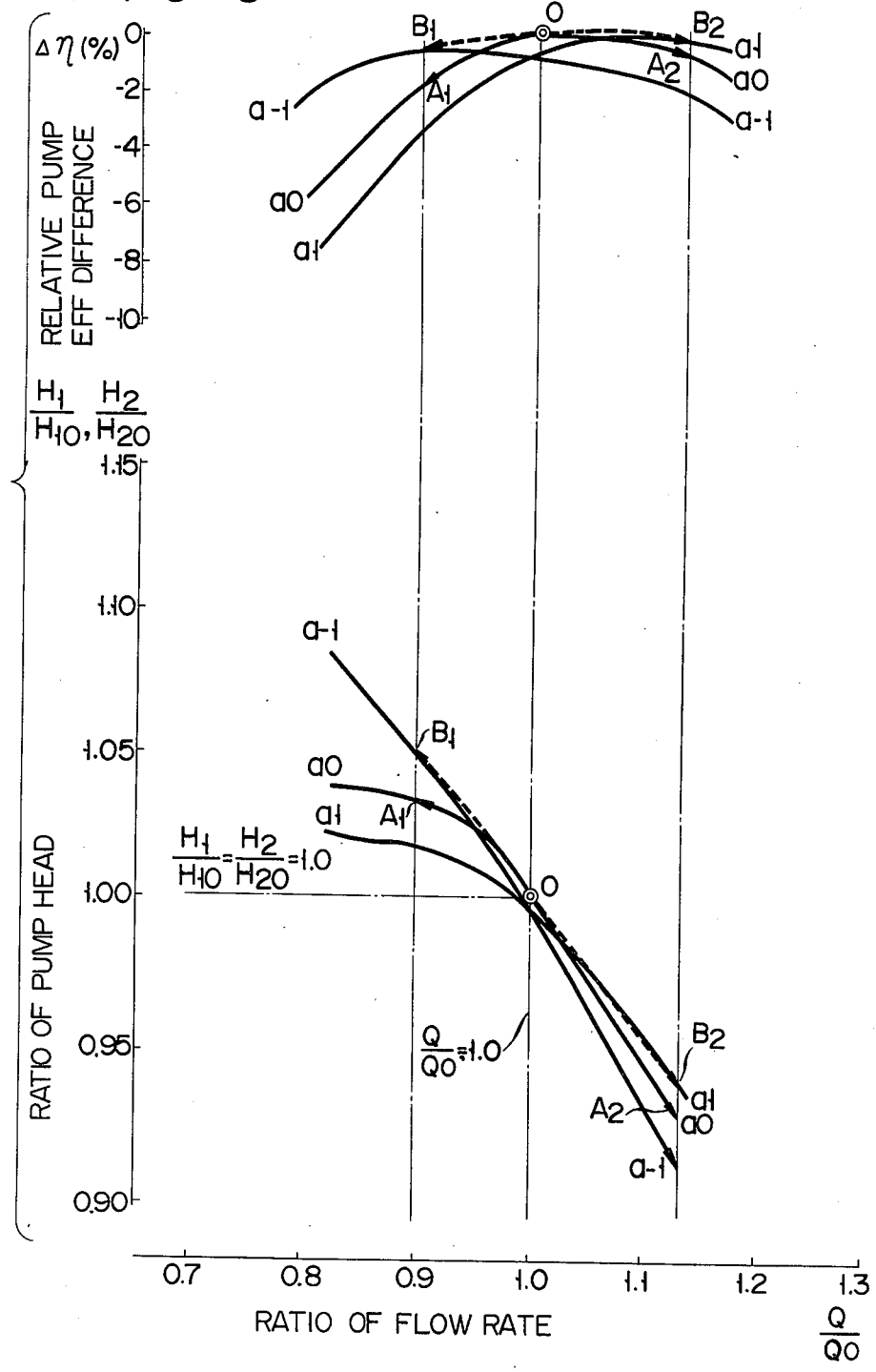
FIG. 3 is a graph showing pump characteristics of the individual stages of the multistage hydraulic machine.

Referring now to the drawing of FIG. 3, there will be described the hydraulic characteristics of the two-stage hydraulic machine in a normal pump operation. FIG. 3 shows hydraulic characteristic curves for the respective stages of the two-stage hydraulic machine in the pump operation. In FIG. 3, H1 is a pump head for the higher-pressure stage 10a, H2 is a pump head for the lower-pressure stage 14a, Q is a flow rate, H10, H20 and Q0 are values corresponding to H1, H2 and Q that are obtained under normal pump operation condition (point O as illustrated) where H1 is equal to H2, a0 is an opening of water path at each stage for the normal pump operation, a1 is an opening of water path at the higher-pressure stage 10a larger than the normal opening a0, a-1 is an opening of water path at the higher-pressure stage 10a smaller than the normal opening a0, and $\Delta\eta$ is a relative pump efficiency difference represented by a relative difference from the maximum pump efficiency. Characteristic curves a0, a1, ... correspond to the openings a0, a1, ... respectively. A combined pump head H0 of the hydraulic machine may be obtained by adding up the pump heads for the two stages. Where the inlet valve 24 of the two-stage hydraulic machine 15 is fully open and each stage is in the normal pump operation condition (point O in FIG. 3), the combined pump head H0 created by the hydraulic machine may be obtained by adding up the equal pump heads for the two stages as follows:

$$H1 + H2 = H0$$

$$H1 = H0/2 = H10 \text{ and}$$

$$H2 = H0/2 = H20 \qquad (5)$$

If the water level at a power plant is raised above the level for the normal operation, the hydraulic machine is required to perform a pump operation with a pump head higher than the normal pump head H0 correspondingly to such raised water level. In this case, the prior art multistage hydraulic machine, having the fixed guide vanes for all stages, is operated with the inlet valve fully open as well as with the fixed normal opening of water path a0 for each stage maintained as it is, so that the operation condition of every stage, with such relatively large normal opening a0, is shifted to the small-flow rate range on the higher-head side along a locus 0→A1. Accordingly, the hydraulic characteristics for each stage will be extremely deteriorated, thereby substantially reducing the integrated hydraulic efficiency of the hydraulic machine.

According to this embodiment, however, although the lower-pressure stage 14a is shifted to the higher-head side to reach A1 maintaining the normal opening a0, high hydraulic performance may be secured for the higher-pressure stage 10a by controlling the opening of the movable guide vanes 12 so as to be smaller than the normal opening a0 to shift the operation condition for the higher-pressure stage 10a to the higher-head side along a locus 0→B1 for the optimum opening condition in accordance with the following relationship.

$$H1 = H2 = H \text{ and}$$

$$H1 > H2 \qquad (6)$$

Accordingly, a small-flow rate operation may be performed with substantially improved integrated hydraulic efficiency as compared with the conventional multistage hydraulic machine. If the water level at the power plant is lowered below the level for the normal operation, on the other hand, the hydraulic machine is required to perform a pump operation with a pump head lower than the normal pump head H0 correspondingly to such lowered water level. In this case, the prior art multistage hydraulic machine, having the fixed guide vanes for all stages, is operated with the inlet valve fully open as well as with the fixed normal opening of water path a0 for each stage maintained as it is, so that the operation condition of every stage, with such relatively small normal opening a0, is shifted to the large-flow rate range on the lower-head side along a locus 0→A2. Accordingly, the hydraulic characteristics for each stage will be deteriorated, thereby reducing the integrated hydraulic efficiency of the hydraulic machine. According to this embodiment, however, although the lower-pressure stage 14a is shifted to the lower-head side to reach A2 maintaining the normal opening a0, high hydraulic performance may be secured for the higher-pressure stage 10a by controlling the opening of the movable guide means 12 so as to be larger than the normal opening a0 to shift the operation condition for the higher-pressure stage 10a to the lower-head side along a locus 0→B2 for the optimum opening condition in accordance with the relationship given by expressions (6), thereby enabling an operation of the hydraulic machine with improved integrated hydraulic capability.

Thus, according to this invention, the multistage hydraulic machine can effectively be operated also in the normal pump operation with improved integrated hydraulic performance in the small-flow rate range on the higher-head side or the large-flow rate range on the lower-head side by controlling the variable opening of water path defined by the movable guide vanes so as to be smaller or larger than the fixed opening of water path defined by the fixed vanes for the lower-pressure stage, respectively.

The operation control means 17 includes control systems 17a and 17b for controlling the movable guide vanes 12 in the normal operation, and an operation control system 17c for the transient operation. The control systems 17a, 17b and 17c are shown in FIGS. 4, 5 and 6 respectively.

FIG. 4 shows a case where an opening of water path a of the movable guide vanes 12 for the highest-pressure stage coupled to a guide vane control unit 52 is adjusted in response to the load for the desirable hydraulic performance as aforesaid by means of a load adjusting unit 50 and the guide vane control unit 52. FIG. 5 shows a case where the opening a of the movable guide vanes 12 is adjusted in response to the water level (turbine head or pump head) for the desirable hydraulic performance by means of the control system formed of a water level regulator 54 and the guide vane control system 52 coupled to the movable guide vanes 12. Operation control in normal condition may easily be achieved by making one or both of the adjustments of FIGS. 4 and 5.

Now there will be described the control for transient operations of the multistage hydraulic machine. It is essential to provide a simple and secure method for controlling transient operations of the complex multistage hydraulic machine with a runner for each stage communicating by means of the return passage. The transient operations are, for example, start and stop of the turbine or pump, rejection of turbine load and failure of pump input.

In the prior art multistage hydraulic machine with the fixed vanes arranged round the runner for each stage, the operating condition is controlled by giving operation control instructions to the inlet valve for the adjustment of the opening of water path, thereby regulating the flow rate or rotating speed. However, such control by means of the inlet valve, unlike the control by guide vanes, makes it difficult to smoothly adjust the water flow, causing substantial turbulence which would involve significant noise and vibration. According to this invention, on the other hand, the opening of water path is adjusted by giving operation control instructions only to the movable guide vanes 12 around the runner for the higher-pressure stage 10a, thereby regulating the flow rate or rotating speed to achieve the control for the operating condition. Since the control instructions are given only to the movable guide vanes 12 for the higher-pressure stage 10a among others, the control may be achieved easily without any trouble attributable to a complicated control system. Moreover, unlike the case of the control by means of the inlet valve control of, the guide vanes enable smooth control for changing the flow rate, producing no significant noise or vibration. The multistage hydraulic machine according to the invention is further characterized in that even if a momentary pressure variation is caused by water hammer in a waterway system coupled with the higher-pressure stage 10a due to a sudden change in flow rate when the guide vanes are closed, the momentary pressure variation wave is caught by the guide vane portion at the higher-pressure stage 10a with small opening or fully closed. Accordingly, such wave is prevented from directly affecting the lower-pressure stage 14a at which the opening of water path is always large, so that the whole machine will never be subjected to any excessive water pressure, thus ensuring highly safe control.

Referring now to FIG. 6, there will be described control for the rejection of turbine load that is the most critical problem among others in the transient operations. A speed change $\Delta N$ (or voltage change $\Delta V$) in a generator directly coupled with the hydraulic machine is detected, thereby controlling the opening of water path of the movable guide vanes 12 for the highest-pressure stage coupled with the control system consisting of a governor unit 56 and the guide vane control unit 52 to achieve easy and secure stabilization of the rotating speed, flow rate, water pressure, etc. As regards the cases of failure of pump input and start or stop of the hydraulic machine, moreover, the point is securely to control the operating conditions of the hydraulic machine in the transient operation by transmitting the operation control instructions only to the movable guide vanes 12 of the highest-pressure stage through the guide vane control unit 52. Since the operation controls as illustrated by FIGS. 4 to 6 are generally known, detailed description of the members and their functions is omitted.

According to this invention, as described above, there may be provided a multistage hydraulic machine which includes highest- to lowest-pressure stages communicating by means of a return passage, movable guide vanes with variable opening of water path being arranged only around a runner for the highest-pressure stage, and fixed guide vanes with fixed opening of water path being arranged around each runner for the lower-pressure stage or stages, so that in normal operation the opening of the movable guide vanes for the highest-pressure stage 10a may be so controlled as to be smaller or larger than that of the fixed guide vanes on the lower-pressure side in accordance with the flow rate, thereby improving the hydraulic characteristics in the normal operation and also ensuring safe control over transient conditions which will be caused when changing the operation mode.

Obviously, numerous modifications and variations of the present invention are possible in light of the above teachings. It is therefore to be understood that within the scope of the appended claims, the invention may be practiced otherwise than as specifically described herein.

What we claim is:

1. A multistage hydraulic machine system comprising:
   a multistage hydraulic pump/pump-turbine having a water passage including
   a highest-pressure stage comprising a first runner, a plurality of movable guide vanes arranged in a circular row around said runner,
   operation and control means for varying opening of said movable guide means for flow of water through said water passage; and
   a lower-pressure stage comprising a second runner, a plurality of fixed guide vanes with fixed openings arranged in a circular row around said second runner, and a return passage intercommunicating the highest- to lowest-pressure stages;

said operation control means controlling opening of said movable guide vanes so that said opening is larger than that of said fixed guide vanes for a large-flow normal operation and smaller than that of said fixed guide vanes for a small-flow normal operation said operation control means further comprising means for supplying instructions during starting of said pump/pump-turbine, stopping of said pump-/pump-turbine, rejection of turbine load or failure of pump input and means for controlling the opening of said water passage of said movable guide vanes in response to operation control instructions received from said means for supplying instructions.

2. A method for controlling a multistage hydraulic machine system having a multistage hydraulic pump-/pump-turbine with a water passage therein and including a highest-pressure stage with a plurality of movable guide vanes which can be opened and which are arranged in a circular row around a first runner and a lower-pressure stage with a plurality of fixed guide vanes with fixed openings arranged in circular row around a second runner and a return passage intercommunicating said highest-pressure stage with said lowest-pressure stage which comprises: controlling opening of the passage of the movable guide vanes so that said opening is larger than that of the fixed guide vanes for a large-flow normal operation and smaller than that of the fixed guide vanes for a small-flow normal operation.

3. A method according to claim 2, wherein the step of controlling the opening of the water passage of said movable guide vanes further comprises supplying operation control instructions during starting of said pump-/pump-turbine, stopping of said pump/pump-turbine, rejection of turbine load or failure of pump input; and controlling the opening in response to the operation control instructions.

* * * * *